US012672071B2

(12) United States Patent
Wu et al.

(10) Patent No.: US 12,672,071 B2
(45) Date of Patent: Jun. 30, 2026

(54) METHOD AND DEVICE FOR POWER CONTROL IN UPLINK AND DOWNLINK BEAM MANAGEMENT

(71) Applicant: Apogee 5G Global, LLC, Plano, TX (US)

(72) Inventors: Keying Wu, Shanghai (CN); Xiaobo Zhang, Shanghai (CN)

(73) Assignee: APOGEE 5G GLOBAL, LLC, Plano, TX (US)

( * ) Notice: Subject to any disclaimer, the term of this patent is extended or adjusted under 35 U.S.C. 154(b) by 0 days.

(21) Appl. No.: 18/510,677

(22) Filed: Nov. 16, 2023

(65) Prior Publication Data

US 2024/0098651 A1 Mar. 21, 2024

Related U.S. Application Data

(63) Continuation of application No. 17/361,333, filed on Jun. 29, 2021, now Pat. No. 11,864,123, which is a (Continued)

(30) Foreign Application Priority Data

Jan. 31, 2020 (CN) .......................... 202010077737.9

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0051* (2013.01); *H04L 25/0226* (2013.01); *H04W 72/046* (2013.01); *H04W 72/21* (2023.01)

(58) Field of Classification Search
CPC ... H04W 72/232; H04W 52/08; H04W 52/10; H04W 52/38; H04W 52/26; H04W 52/04;
(Continued)

(56) References Cited

U.S. PATENT DOCUMENTS

2019/0261281 A1 8/2019 Hyejung et al.
2019/0364617 A1 11/2019 Wu et al.
(Continued)

FOREIGN PATENT DOCUMENTS

CN 106575984 A 4/2017
CN 110248402 A 9/2019
(Continued)

OTHER PUBLICATIONS

First Office Action of Chinese patent application No. CN202210682765.2 dated Oct. 9, 2024.
(Continued)

*Primary Examiner* — Tu X Nguyen
(74) *Attorney, Agent, or Firm* — Volpe Koenig

(57) ABSTRACT

The present disclosure provides a method and device in a node used for wireless communications. A first node receives a first signaling; and transmits a first signal; the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal. The above method unifies Uplink beam management mechanism and Downlink beam management mechanism, and solves the power control problem of Uplink transmission under a unified beam management mechanism.

20 Claims, 5 Drawing Sheets

100

Related U.S. Application Data continuation of application No. PCT/CN2021/073008, filed on Jan. 21, 2021.

(51) Int. Cl.
| | | |
|---|---|---|
| *H04L 25/02* | (2006.01) | |
| *H04W 72/044* | (2023.01) | |
| *H04W 72/21* | (2023.01) | |

(58) Field of Classification Search
CPC ..... H04W 52/06; H04W 88/06; H04W 52/46; H04W 52/54; H04W 72/231; H04W 92/18; H04W 52/34; H04W 52/146; H04W 52/242; H04W 52/18; H04W 52/322

See application file for complete search history.

(56) References Cited

U.S. PATENT DOCUMENTS

| | | | |
|---|---|---|---|
| 2020/0100232 A1 | 3/2020 | Onggosanusi et al. | |
| 2020/0266867 A1* | 8/2020 | Park ...................... | H04L 1/0681 |

FOREIGN PATENT DOCUMENTS

| | | |
|---|---|---|
| CN | 110290551 A | 9/2019 |
| CN | 110536435 A | 12/2019 |
| WO | 2019049107 A1 | 3/2019 |
| WO | 2019113766 A1 | 6/2019 |

OTHER PUBLICATIONS

First Search Report of Chinese patent application No. CN202210682765.2 dated Sep. 29, 2024.

CN202010077737.9 Notification to Grant Patent Right for Invention dated May 7, 2022.

CN202010077737.9 1st Office Action dated Nov. 18, 2021.

CN202010077737.9 First Search Report dated Nov. 9,2021.

ISR in application PCT/CN2021/073008 dated Mar. 30, 2021.

Motorola Mobility et al: "Remaining Details on non-CA NR UL power control", 3GPP Draft; R1-1807278_Power-Control-Non-CA-Final, 3rd Generation~Partnership Project(3GPP), Mobile Competence Centre ; 650, Route 'Des LUCIOLES;F-06921 Sophia-Antipolis Cedex.

Nokia et al:"Enhancements on Multi-beam Operation", 3GPP Draft; R1-1909210,3rd Generation Partnership Project (3GPP), Mobile Competence Centre ; 650, Route Des LUCIOLES;F-06921 Sophia-Antipolis Cedex.

Third Generation Partnership Project, "Technical Specification Group Radio Access Network; NR; Physical channels and modulation (Release 16)," 3GPP TS 38.211 V16.0.0 (Dec. 2019).

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network; NR; Medium Access Control (MAC) protocol specification (Release 15)," 3GPP TS 38.321 V15.8.0 (Dec. 2019).

Third Generation Partnership Project, "Technical Specification Group Radio Access Network NR Radio Resource Control (RRC) protocol specification (Release 16)," 3GPP TS 38.331 V15.8.0 (Dec. 2019).

* cited by examiner

100

5GS/EPS 200

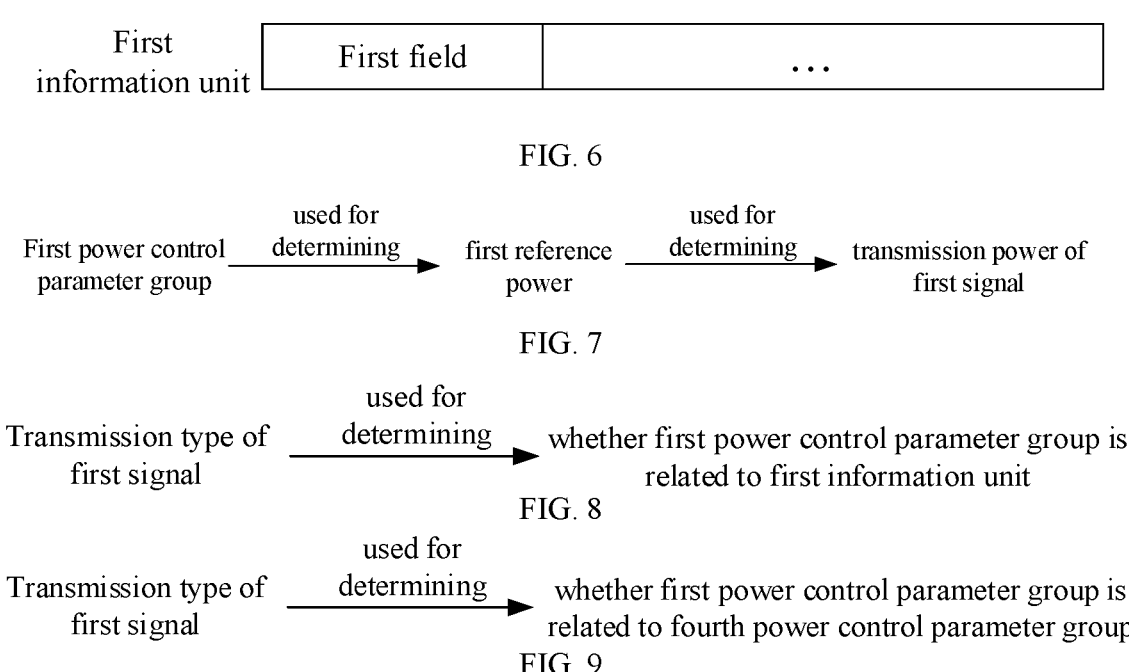

First information unit

| First field | . . . |
| --- | --- |

FIG. 6

First power control parameter group →(used for determining)→ first reference power →(used for determining)→ transmission power of first signal

FIG. 7

Transmission type of first signal →(used for determining)→ whether first power control parameter group is related to first information unit

FIG. 8

Transmission type of first signal →(used for determining)→ whether first power control parameter group is related to fourth power control parameter group

FIG. 9

Relation between first power control parameter group and first information unit comprises: first power control parameter group is related to which group of P1 power control parameter groups

FIG. 10

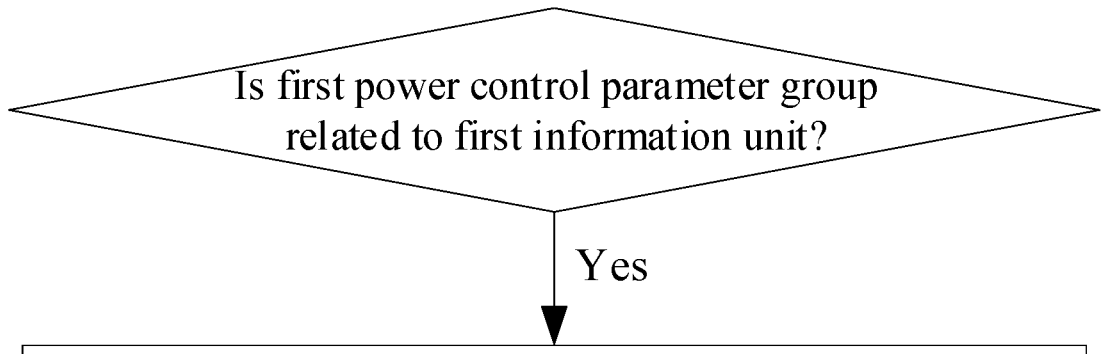

Is first power control parameter group related to first information unit?

Yes

Relation between first power control parameter group and first information unit comprises: first power control parameter group is related to which group of P1 power control parameter groups

FIG. 11

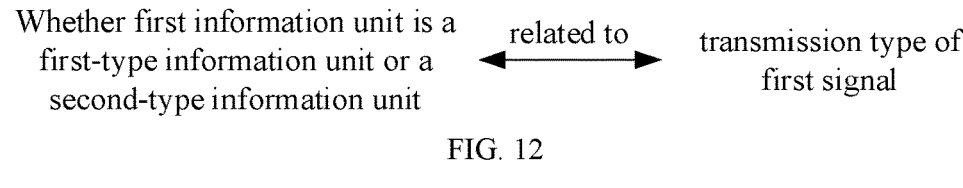

Whether first information unit is a first-type information unit or a second-type information unit ◄— related to —► transmission type of first signal

FIG. 12

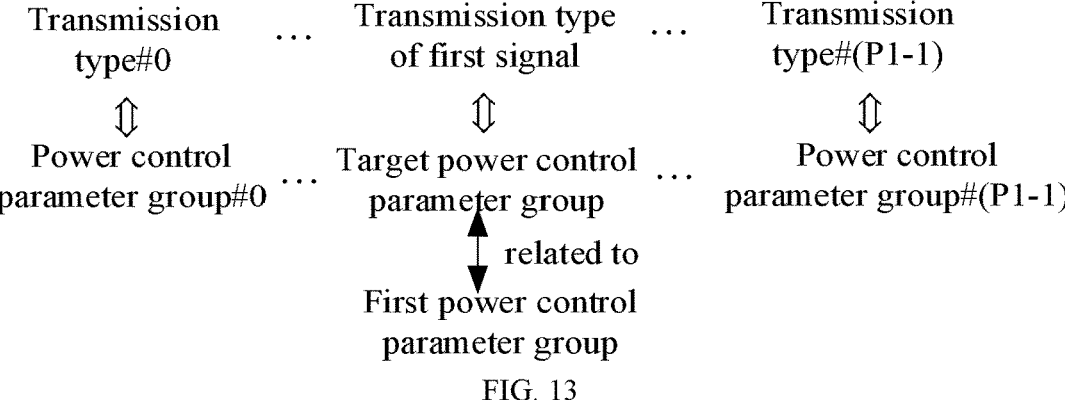

Transmission type#0 ... Transmission type of first signal ... Transmission type#(P1-1)

⇕          ⇕          ⇕

Power control parameter group#0 ... Target power control parameter group ... Power control parameter group#(P1-1)

↕ related to

First power control parameter group

FIG. 13

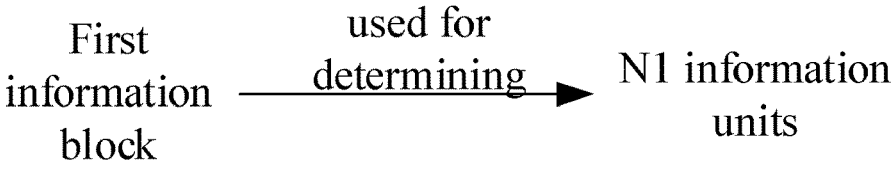

First signaling | Third field | ... |

FIG. 14

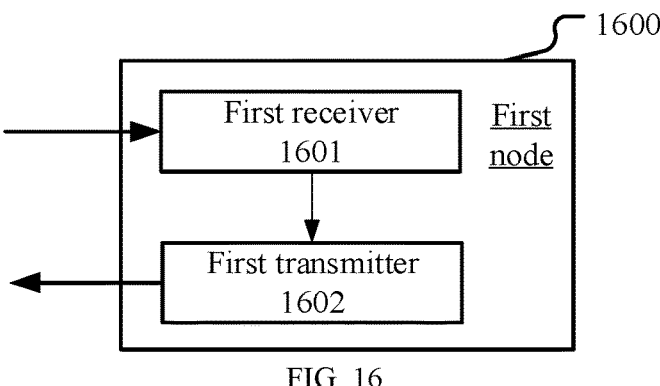

First information block —— used for determining —► N1 information units

First receiver 1601          First node

First transmitter 1602

FIG. 16

METHOD AND DEVICE FOR POWER CONTROL IN UPLINK AND DOWNLINK BEAM MANAGEMENT

CROSS REFERENCE TO RELATED APPLICATIONS

This application is a continuation of the U.S. patent application Ser. No. 17/361,333, field on Jun. 29, 2021, and is a continuation of International Application No. PCT/CN2021/073008, filed Jan. 21, 2021, claims the priority benefit of Chinese Patent Application No. 202010077737.9, filed on Jan. 31, 2020, the full disclosure of which is incorporated herein by reference.

BACKGROUND

Technical Field

The present disclosure relates to transmission methods and devices in wireless communication systems, and in particular to a method and device of radio signal transmission in wireless communications that support cellular networks.

Related Art

Multi-antenna technology is a key technique in both $3^{rd}$ Generation Partner Project (3GPP) Long-term Evolution (LTE) and New Radio (NR) systems. By configuring multiple antennas at a communication node, for instance, at a base station or a User Equipment (UE) to acquire extra spatial degrees of freedom. The multiple antennas form through beamforming a beam pointing in a specific direction to improve communication quality. When the multiple antennas belong to multiple Transmitter Receiver Points (TRPs)/panels, the spatial differences among these TRPs/panels can be utilized to get extra diversity gains. Since the beam formed through beamforming of multiple antennas is usually narrow, beams from both sides of communication shall be aligned to enable effective communication. When UE mobility or other factors lead to the out-of-step of a transmission/reception beam, the communications will face a large decline in quality or even communication failure. So, beam management is proposed in NR Release® 15 and R16 for beam selection and updating between two communication sides, thus achieving performance gains brought by multiple antennas.

SUMMARY

Inventors find through researches that in NR R15 and R16, mechanisms employed for Uplink beam management and Downlink beam management are different, which increases the system complexity and has a negative impact on signaling overhead and delay, and the performance of Uplink transmission will be constrained due to such a difference. In R15, a Transmission Configuration Indicator (TCI) mechanism has been introduced in Downlink transmission for performing beam management. For the purpose of enhancing Uplink beam management and improving performance of Uplink transmission, the TCI mechanism in R15 can be extended to Uplink transmission. In R15 and R16, power control parameters employed in Uplink power control are associated with Sounding Reference Signal (SRS) resources. So how to determine power control parameters under the TCI mechanism is a problem to be solved.

In view of the above problem, the present disclosure provides a solution. It should be noted that although the above description adopts the cellular network communication scenario as an example, the present disclosure is also applicable to other scenarios, such as Sidelink communication scenario, and achieve similar technical effects in the cellular network communication scenario. Additionally, the adoption of a unified solution for various scenarios (including but not limited to Sidelink communications and cellular communications) contributes to the reduction of hardware complexity and costs. If no conflict is incurred, embodiments in a first node in the present disclosure and the characteristics of the embodiments are also applicable to a second node, and vice versa. What's more, the embodiments in the present disclosure and the characteristics in the embodiments can be arbitrarily combined if there is no conflict.

The present disclosure provides a method in a first node for wireless communications, comprising:

receiving a first signaling; and transmitting a first signal;

herein, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

In one embodiment, a problem to be solved in the present disclosure comprises: how to determine power control parameters adopted in Uplink transmission under the TCI mechanism. The above method solves this problem by establishing a connection between a TCI state and power control parameters.

In one embodiment, the above method is characterized in that the first information unit indicates a TCI state corresponding to the first signal and power control parameters adopted in the first signal simultaneously.

In one embodiment, the above method is characterized in that whether the first information unit indicates power control parameters adopted by the first signal is related to a transmission type of the first signal.

In one embodiment, the above method is characterized in that the first information unit indicates multiple groups of power control parameters, and which power control parameter in the multiple groups of power control parameters adopted by the first signal is related to a transmission type of the first signal.

In one embodiment, the above method is advantageous in that Uplink beam management mechanism and Downlink beam management mechanism are unified, which improves performance of Uplink transmission, thus reducing corresponding signaling overhead and delay.

In one embodiment, the above method is advantageous in that the power control problem of Uplink transmission is solved under the unified Uplink and Downlink beam management mechanism.

In one embodiment, the above method is advantageous in that different power control parameters are supported to be adopted for different Uplink transmission types, which satisfies requirements of different transmission types, thus improving efficiency.

According to one aspect of the present disclosure, wherein the relation between the first power control parameter group and the first information unit comprises whether the first power control parameter group is related to the first information unit.

According to one aspect of the present disclosure, wherein the first information unit is used for determining P1 power control parameter groups, P1 being a positive integer greater than 1; the relation between the first power control parameter group and the first information unit comprises that the first power control parameter group is related to which group of the P1 power control parameter groups.

According to one aspect of the present disclosure, wherein the first information unit is a first-type information unit or a second-type information unit; the first-type information unit comprises the first field and a second field, and the second-type information unit comprises only the first field in the first field and the second field; the second field in the first-type information unit is used for determining a power control parameter group; whether the first information unit is the first-type information unit or the second-type information unit is related to the transmission type of the first signal.

According to one aspect of the present disclosure, wherein when the transmission type of the first signal belongs to a second transmission type subset and the first information unit is the first-type information unit, the first power control parameter group is unrelated to the second field in the first information unit.

According to one aspect of the present disclosure, wherein the P1 power control parameter groups respectively correspond to P1 transmission types, and the transmission type of the first signal is one of the P1 transmission types; a target power control parameter group is one of the P1 power control parameter groups corresponding to the transmission type of the first signal, and the first power control parameter group is related to the target power control parameter group.

According to one aspect of the present disclosure, comprising:
receiving a first information block;
herein, the first information block is used for determining N1 information units, and the first information unit is one of the N1 information units, N1 being a positive integer greater than 1.

According to one aspect of the present disclosure, wherein the first node is a UE.

According to one aspect of the present disclosure, wherein the first node is a relay node.

The present disclosure provides a method in a second node for wireless communications, comprising:
transmitting a first signaling; and
receiving a first signal;
herein, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

According to one aspect of the present disclosure, wherein the relation between the first power control parameter group and the first information unit comprises whether the first power control parameter group is related to the first information unit.

According to one aspect of the present disclosure, wherein the first information unit is used for determining P1 power control parameter groups, P1 being a positive integer greater than 1; the relation between the first power control parameter group and the first information unit comprises that the first power control parameter group is related to which group of the P1 power control parameter groups.

According to one aspect of the present disclosure, wherein the first information unit is a first-type information unit or a second-type information unit; the first-type information unit comprises the first field and a second field, and the second-type information unit comprises only the first field in the first field and the second field; the second field in the first-type information unit is used for determining a power control parameter group; whether the first information unit is the first-type information unit or the second-type information unit is related to the transmission type of the first signal.

According to one aspect of the present disclosure, wherein when the transmission type of the first signal belongs to a second transmission type subset and the first information unit is the first-type information unit, the first power control parameter group is unrelated to the second field in the first information unit.

According to one aspect of the present disclosure, wherein the P1 power control parameter groups respectively correspond to P1 transmission types, and the transmission type of the first signal is one of the P1 transmission types; a target power control parameter group is one of the P1 power control parameter groups corresponding to the transmission type of the first signal, and the first power control parameter group is related to the target power control parameter group.

According to one aspect of the present disclosure, comprising:
transmitting a first information block;
herein, the first information block is used for determining N1 information units, and the first information unit is one of the N1 information units, N1 being a positive integer greater than 1.

According to one aspect of the present disclosure, wherein the second node is a base station.

According to one aspect of the present disclosure, wherein the second node is a UE.

According to one aspect of the present disclosure, wherein the second node is a relay node.

The present disclosure provides a first node for wireless communication, comprising:
a first receiver, receiving a first signaling; and
a first transmitter, transmitting a first signal;
herein, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

The present disclosure provides a second node for wireless communications, comprising:

a second transmitter, transmitting a first signaling; and a second receiver, receiving a first signal;

herein, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

In one embodiment, the present disclosure has the following advantages over conventional schemes:

Uplink beam management mechanism and Downlink beam management mechanism are unified, which improves performance of Uplink transmission, thus reducing corresponding signaling overhead and delay.

the power control problem of Uplink transmission is solved under unified Uplink and Downlink TCI mechanism.

different power control parameters are supported to be adopted for different Uplink transmission types to satisfy requirements of different transmission types, thus improving performance.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of a first information unit according to one embodiment of the present disclosure.

FIG. 7 illustrates a schematic diagram of a first power control parameter group used for determining transmission power of a first signal according to one embodiment of the present disclosure.

FIG. 8 illustrates a schematic diagram of whether a relation between a first power control parameter group and a first information unit comprises a first power control parameter group related to a first information unit according to one embodiment of the present disclosure.

FIG. 9 illustrates a schematic diagram of whether a relation between a first power control parameter group and a first information unit comprises a first power control parameter group related to a first information unit according to one embodiment of the present disclosure.

FIG. 10 illustrates a schematic diagram of whether a relation between a first power control parameter group and a first information unit comprises a first power control parameter group related to which group of P1 power control parameter groups according to one embodiment of the present disclosure.

FIG. 11 illustrates a schematic diagram of whether a relation between a first power control parameter group and a first information unit comprises a first power control parameter group related to which group of P1 power control parameter groups according to one embodiment of the present disclosure.

FIG. 12 illustrates a schematic diagram of whether a first information unit is a first-type information unit or a second-type information unit related to a transmission type of a first signal according to one embodiment of the present disclosure.

FIG. 13 illustrates a schematic diagram of relations among P1 power control parameter groups and P1 transmission types according to one embodiment of the present disclosure.

FIG. 14 illustrates a schematic diagram of a first signaling according to one embodiment of the present disclosure.

FIG. 15 illustrates a schematic diagram of a first information block according to one embodiment of the present disclosure.

FIG. 16 illustrates a structure block diagram of a processing device in a first node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
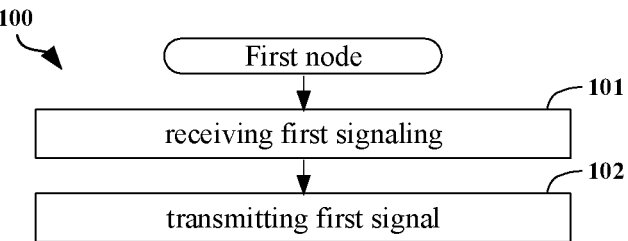
FIG. 1 illustrates a flowchart of a first signaling and a first signal according to one embodiment of the present disclosure.

Embodiment 1 illustrates a flowchart of a first signaling and a first signal according to one embodiment of the present disclosure, as shown in FIG. 1. In step 100 illustrated by FIG. 1, each box represents a step. Particularly, the sequential order of steps in these boxes does not necessarily mean that the steps are chronologically arranged.

In Embodiment 1, the first node in the present disclosure receives a first signaling in step 101; transmits a first signal in step 102. Herein, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

In one embodiment, the first signaling is a dynamic signaling.

In one embodiment, the first signaling is a layer 1 (L1) signaling.

In one embodiment, the first signaling is a L1 control signaling.

In one embodiment, the first signaling comprises Down-link Control Information (DCI).

In one embodiment, the first signaling comprises one or more fields in a piece of DCI.

In one embodiment, the first signaling comprises DCI for UpLink Grant.

In one embodiment, the first signaling comprises Sidelink Control Information (SCI).

In one embodiment, the first signaling comprises one or more fields in a piece of SCI.

In one embodiment, the first signaling is transmitted on a DownLink.

In one embodiment, the first signaling is transmitted on a Sidelink.

In one embodiment, the first signaling is a higher-layer signaling.

In one embodiment, the first signaling is a Radio Resource Control (RRC) signaling.

In one embodiment, the first signaling comprises information in all or part of fields in an Information Element (IE).

In one embodiment, the first signaling comprises information in all or part of fields in a PUCCH-Config IE.

In one embodiment, the first signaling comprises information in all or part of fields in an SRS-ResourceSet IE.

In one embodiment, the first signaling is a Medium Access Control layer Control Element (MAC CE) signaling.

In one embodiment, the first signal is a radio signal.

In one embodiment, the first signal is a baseband signal.

In one embodiment, the first signal is a radio-frequency signal.

In one embodiment, the first signal is transmitted on an Uplink.

In one embodiment, the first signal is transmitted on a Sidelink.

In one embodiment, the first signal comprises a second bit block, and the second bit block is one of a Transport Block (TB), a Code Block (CB) or a Code Block Group (CBG).

In one embodiment, the first signal comprises an SRS.

In one embodiment, the first signal comprises Uplink Control Information (UCI).

In one embodiment, the first signal comprises a Hybrid Automatic Repeat reQuest-Acknowledgement (HARQ-ACK).

In one embodiment, the first signaling indicates the configuration information of the first signal.

In one embodiment, the first signaling explicitly indicates the configuration information of the first signal.

In one embodiment, the first signaling explicitly indicates part of configuration information in the configuration information of the first signal.

In one embodiment, the first signaling implicitly indicates the configuration information of the first signal.

In one embodiment, the first signaling explicitly indicates part of the configuration information of the first signal and implicitly indicates another part of the configuration information of the first signal.

In one embodiment, the first signal is transmitted on a PUSCH, and the configuration information of the first signal comprises configuration information carrying a PUSCH of the first signal.

In one embodiment, the configuration information of the first signal includes one or more of occupied time-domain resources, occupied frequency-domain resources, a Modulation and Coding Scheme (MCS), configuration information of DeModulation Reference Signals (DMRS), a Hybrid Automatic Repeat reQuest (HARQ) process number, a Redundancy Version (RV) or a New Data Indicator (NDI).

In one embodiment, the first signal is transmitted on a Physical Uplink Control CHannel (PUCCH), and the configuration information of the first signal comprises configuration information carrying a PUCCH of the first signal.

In one embodiment, the configuration information of the first signal includes one or more of occupied time-domain resources, occupied frequency-domain resources, occupied code-domain resources, an RS sequence, a mapping mode, a cyclic shift, an Orthogonal Cover Code (OCC) or repeat times.

In one embodiment, the first signal comprises an SRS, and the configuration information of the first signal comprises configuration information of the SRS comprised in the first signal.

In one embodiment, the configuration information of the first signal includes one or more of occupied time-domain resources, occupied frequency-domain resources, occupied code-domain resources, low Peak-to-Average Power Ratio (PAPR) sequence, pseudo-random sequence, a cyclic shift, an OCC, an orthogonal sequence or a PUCCH format.

In one embodiment, the first signaling indicates a first information unit.

In one embodiment, the first signaling explicitly indicates the first information unit.

In one embodiment, the first signaling implicitly indicates the first information unit.

In one embodiment, the first field in the first information unit indicates an identifier of the first reference-signal resource.

In one embodiment, the identifier of the first reference-signal resource comprises an NZP-CSI-RS-ResourceId.

In one embodiment, the identifier of the first reference-signal resource comprises an NZP-CSI-RS-ResourceSetId.

In one embodiment, the identifier of the first reference-signal resource comprises an SSB-Index.

In one embodiment, the identifier of the first reference-signal resource comprises an SRS-ResourceSetId.

In one embodiment, the identifier of the first reference-signal resource comprises an SRS-ResourceId.

In one embodiment, the identifier of the first reference-signal resource comprises a panel Id.

In one embodiment, the first reference-signal resource comprises a Channel State Information Reference Signal (CSI-RS) resource.

In one embodiment, the first reference-signal resource comprises a CSI-RS resource set.

In one embodiment, the first reference-signal resource comprises an SRS resource.

In one embodiment, the first reference-signal resource comprises an SRS resource set.

In one embodiment, the first reference-signal resource comprises a Synchronization Signal/physical broadcast channel Block (SSB) resource.

In one embodiment, the spatial-domain filter refers to a spatial domain filter.

In one embodiment, the spatial domain filter comprises a spatial domain transmission filter.

In one embodiment, the spatial domain filter comprises a spatial domain receive filter.

In one embodiment, the phrase that the first reference-signal resource is used for determining a spatial domain filter of the first signal comprises: a spatial domain filter applied to the first reference-signal resource is used for determining the spatial domain filter of the first signal.

In one embodiment, the phrase that the first reference-signal resource is used for determining a spatial domain filter of the first signal comprises: the first node transmits a reference signal and the first signal in the first reference-signal resource with a same spatial-domain filter.

In one embodiment, the phrase that the first reference-signal resource is used for determining a spatial domain filter of the first signal comprises: the first node receives a reference signal and transmits the first signal in the first reference-signal resource with a same spatial-domain filter.

In one embodiment, the phrase that the first reference-signal resource is used for determining a spatial domain filter of the first signal comprises: at least one transmission antenna port of a reference signal transmitted in the first reference-signal resource and at least one transmission antenna port of the first signal are Quasi co-located (QCL).

In one embodiment, the phrase that the first reference-signal resource is used for determining a spatial domain filter of the first signal comprises: at least one transmission antenna port of a reference signal transmitted in the first reference-signal resource and at least one transmission antenna port of the first signal are QCL and a corresponding QCL type is QCL-typeD.

In one embodiment, the first power control parameter group comprises one or more of $P_0$ for power control of the first signal, $\alpha$ for power control of the first signal, an identifier of a reference-signal resource for measuring pathloss when calculating transmission power of the first signal or an index of a power control adjustment state corresponding to the first signal.

In one embodiment, The first power control parameter group comprises $P_0$ for power control of the first signal, $\alpha$ for power control of the first signal, an identifier of a reference-signal resource for measuring pathloss when calculating transmission power of the first signal and an index of a power control adjustment state corresponding to the first signal.

In one embodiment, the first power control parameter group comprises $P_0$ for power control of the first signal, $\alpha$ for power control of the first signal and an index of a power control adjustment state corresponding to the first signal.

In one embodiment, the first power control parameter group comprises $P_0$ for power control of the first signal, an identifier of a reference-signal resource for measuring pathloss when calculating transmission power of the first signal and an index of a power control adjustment state corresponding to the first signal.

In one embodiment, the first power control parameter group comprises $P_0$ for power control of the first signal and an identifier of a reference-signal resource for measuring pathloss when calculating transmission power of the first signal.

In one embodiment, the transmission type of the first signal belongs to a first transmission type set, the first transmission type set comprises a positive integer number of transmission types, and the first transmission type set comprises Physical Uplink Shared CHannel (PUSCH) transmission, PUCCH transmission and SRS transmission.

In one embodiment, the transmission type of the first signal is one of PUSCH transmission, PUCCH transmission or SRS transmission.

In one embodiment, when the first signal is transmitted on a PUSCH, the transmission type of the first signal is PUSCH transmission; when the first signal is transmitted on a PUCCH, the transmission type of the first signal is PUCCH transmission; and when the first signal comprises an SRS, the transmission type of the first signal is SRS transmission.

Embodiment 2

Figure 2:
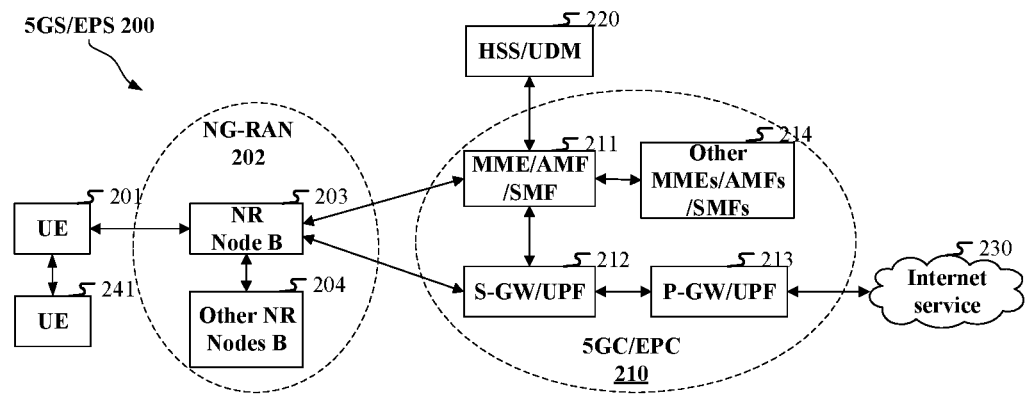
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the first node in the present disclosure comprises the UE 241.

In one embodiment, the second node in the present disclosure comprises the gNB 203.

In one embodiment, the second node in the present disclosure comprises the UE 241.

In one embodiment, a radio link between the UE 201 and the gNB 203 is a cellular network link.

In one embodiment, a radio link between the UE 201 and the UE 241 is a Sidelink.

In one embodiment, a transmitter of the first signaling in the present disclosure comprises the gNB 203.

In one embodiment, a receiver of the first signaling in the present disclosure comprises the UE 241.

In one embodiment, a transmitter of the first signal in the present disclosure comprises the UE 241.

In one embodiment, a receiver of the first signal comprises the gNB 203.

Embodiment 3

Figure 3:
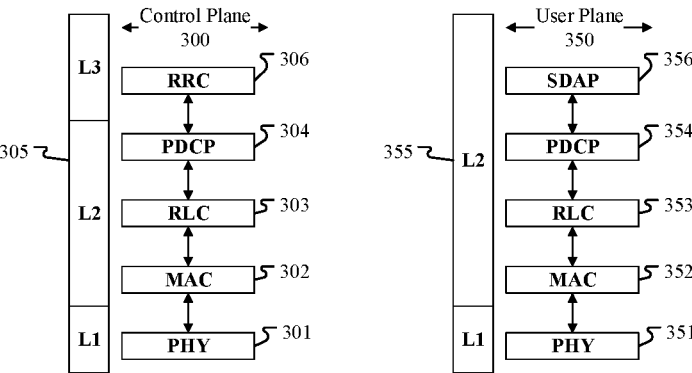
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, a RSU in gNB or V2X) and a second communication node (gNB, a RSU in UE or V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling is generated by the PHY 301 or the PHY 351.

In one embodiment, the first signaling is generated by the MAC sublayer 302 or the MAC sublayer 352.

In one embodiment, the first signaling is generated by the RRC sublayer 306.

In one embodiment, the first signal is generated by the PHY 301 or the PHY 351.

In one embodiment, the first information block is generated by the RRC sublayer 306.

Embodiment 4

Figure 4:
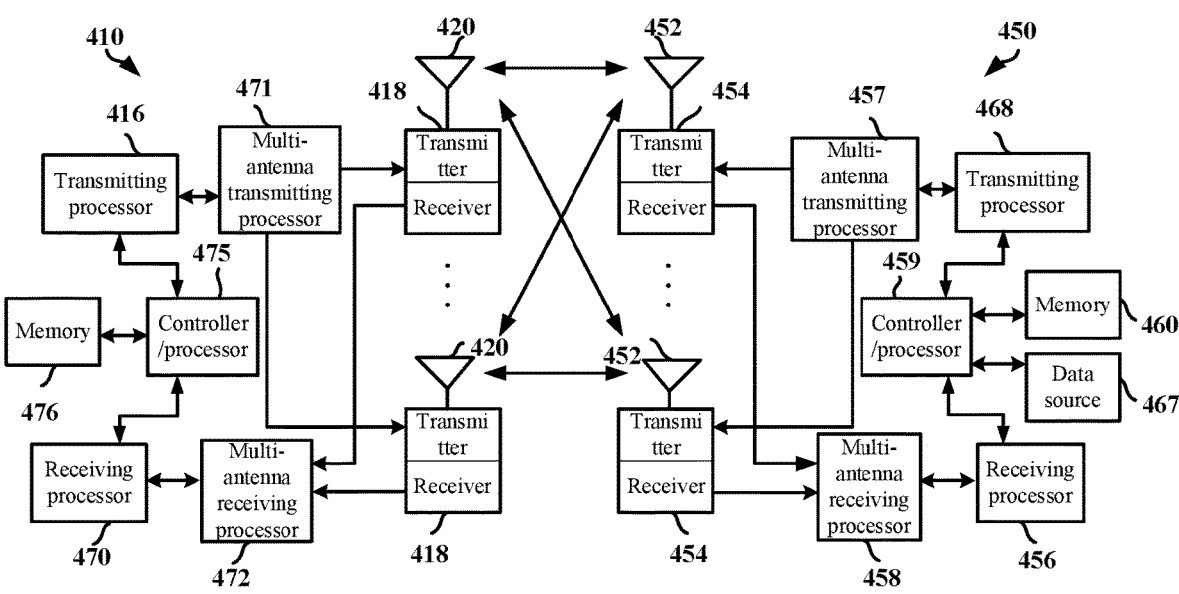
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling in the present disclosure; and transmits the first signal in the present disclosure. Herein, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

In one embodiment, the second communication device 450 comprises a memory that stores a computer readable instruction program. The computer readable instruction program generates an action when executed by at least one processor. The action includes: receiving the first signaling in the present disclosure; and transmitting the first signal in the present disclosure. Herein, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling in the present disclosure; and receives the first signaling in the present disclosure. Herein, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

In one embodiment, the first communication device 410 comprises a memory that stores a computer readable instruction program. The computer readable instruction program generates an action when executed by at least one processor. The action includes: transmitting the first signaling in the present disclosure; and receiving the first signal in the present disclosure. Herein, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

In one embodiment, the first node comprises the second communication device 450 in the present disclosure.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460, or the data source 467 is used for receiving the first signaling in the present disclosure; and at least one of the antenna 420, the transmitter 418, the transmitting processor 416, the multi-antenna transmitting processor 471, the controller/processor 475, or the memory 476 is used to transmit the first signaling in the present disclosure.

In one embodiment, at least one of the antenna 420, the receiver 418, the receiving processor 470, the multi-antenna receiving processor 472, the controller/processor 475, or the memory 476 is used to receive the first signal in the present disclosure; and at least one of the antenna 452, the transmitter 454, the transmitting processor 468, the multi-antenna transmitting processor 457, the controller/processor 459, the memory 460, or the data source 467 is used to transmit the first signal in the present disclosure.

In one embodiment, at least one of the antenna 452, the receiver 454, the receiving processor 456, the multi-antenna receiving processor 458, the controller/processor 459, the memory 460, or the data source 467 is used to receive the first information block in the present disclosure; and at least one of the antenna 420, the transmitter 418, the transmitting processor 416, the multi-antenna transmitting processor 471, the controller/processor 475, or the memory 476 is used to transmit the first information block in the present disclosure.

Embodiment 5

Figure 5:
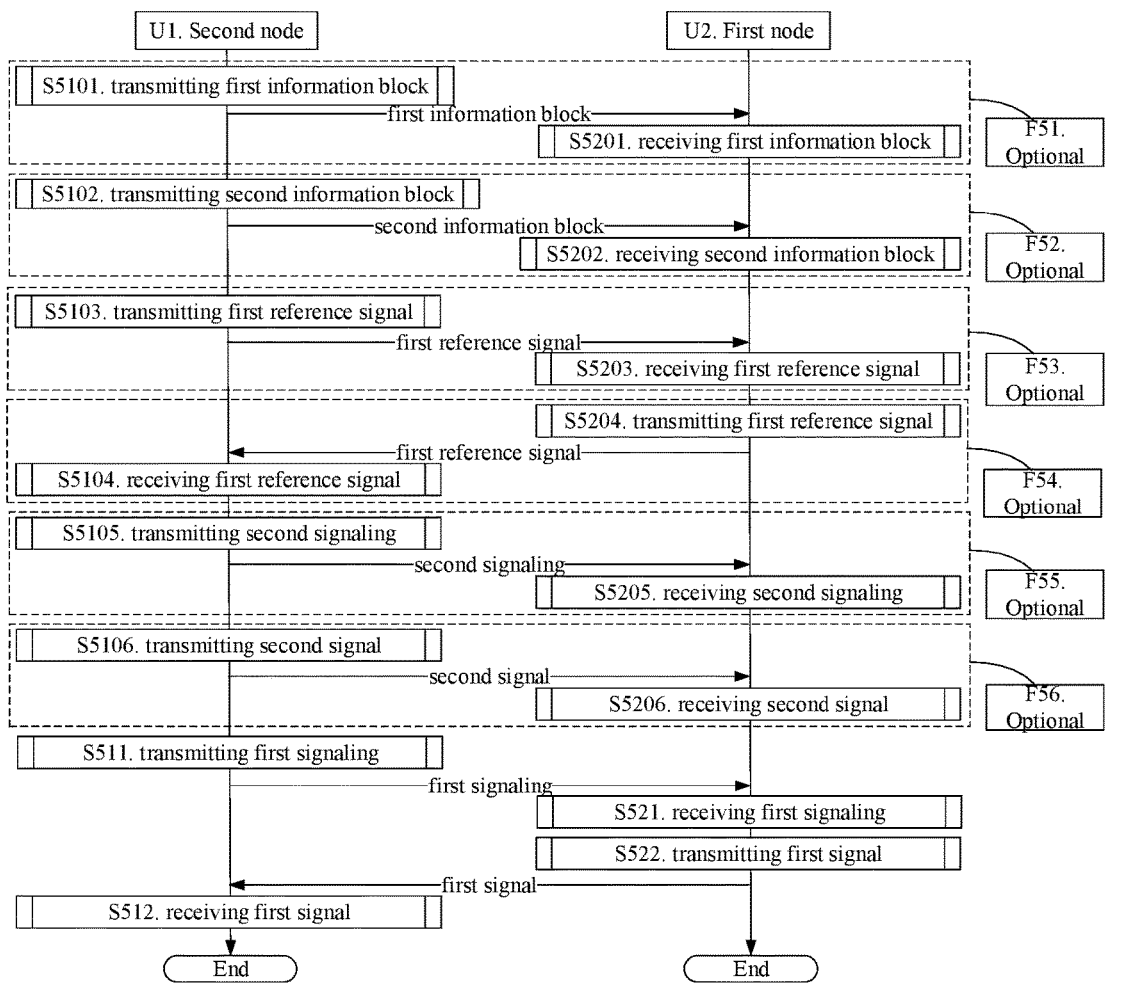
FIG. 5 illustrates a flowchart of wireless communications according to one embodiment of the present disclosure.

Embodiment 5 illustrates a flowchart of wireless transmission according to one embodiment in the present disclosure, as shown in FIG. 5. In FIG. 5, a second node U1 and a first node U2 are in communication via air interfaces. In FIG. 5, steps marked by boxes F51 to F56 are respectively optional, wherein steps marked by only one of box F53 or box F54 exist.

The second node U1 transmits a first information block in step S5101; transmits a second information block in step S5102; transmits a first reference signal in step S5103; receives a first reference signal in step S5104; transmits a second signaling in step S5105; transmits a second signal in step S5106; transmits a first signaling in step S511; and receives a first signal in step S512.

The first node U2 receives a first information block in step S5201; receives a second information block in step S5202; receives a first reference signal in step S5203; transmits a first reference signal in step S5204; receives a second signaling in step S5205; receives a second signal in step S5206; receives a first signaling in step S521; and transmits a first signal in step S522.

In Embodiment 5, the first signaling is used by the first node U2 for determining configuration information of the first signal; the first signaling is used by the first node U2 for determining a first information unit, the first information unit comprises a first field, the first field in the first information unit indicates a first reference-signal resource, and the first reference-signal resource is used by the first node U2 for determining a spatial-domain filter of the first signal; a first power control parameter group is used by the first node U2 for determining transmission power of the first signal, and a relation between the first power control parameter group and the first information unit is related to a transmission type of the first signal.

In one embodiment, the first node U2 is the first node in the present disclosure.

In one embodiment, the second node U1 is the second node in the present disclosure.

In one embodiment, an air interface between the second node U1 and the first node U2 comprises a radio interface between a base station and a UE.

In one embodiment, an air interface between the second node U1 and the first node U2 comprises a radio interface between UEs.

In one embodiment, the first signaling is transmitted on a downlink physical layer control channel (i.e., a downlink channel that is only capable of carrying a physical layer signaling).

In one embodiment, the first signaling is transmitted on a Physical Downlink Control Channel (PDCCH).

In one embodiment, the first signaling is transmitted on a Physical Sidelink Control Channel (PSCCH).

In one embodiment, the first signaling is transmitted on a downlink physical layer data channel (i.e., a downlink channel capable of carrying physical layer data).

In one embodiment, the first signaling is transmitted on a Physical Downlink Shared CHannel (PDSCH).

In one embodiment, the first signal is transmitted on an Uplink physical layer data channel (i.e., an Uplink channel capable of carrying physical layer data).

In one embodiment, the first signal is transmitted on a PUSCH.

In one embodiment, the first signal is transmitted on an Uplink physical layer control channel (that is, an Uplink channel only capable of carrying a physical layer signaling).

In one embodiment, the first signal is transmitted on a PUCCH.

In one embodiment, the steps marked by the box F51 in FIG. 5 exist; the first information block is used by the first node U2 for determining N1 information units, N1 being a positive integer greater than 1; and the first information unit is one of the N1 information units.

In one embodiment, the first information block is transmitted on a PDSCH.

In one embodiment, the steps marked by the box F51 in FIG. 5 do not exist.

In one embodiment, the steps marked by the box F52 in FIG. 5 exist; and the second information block is used for activating N2 information units out of the N1 information units, N2 being a positive integer greater than 1 and no greater than the N1.

In one embodiment, when the transmission type of the first signal is PUSCH transmission, the first information unit is one of the N2 information units.

In one embodiment, the second information block is carried by a MAC CE signaling.

In one embodiment, the second information block comprises a MAC CE.

In one embodiment, the second information block comprises a MAC CE for activation/deactivation of physical shared channel TCI state.

In one subembodiment of the above embodiment, the physical shared channel comprises a PDSCH.

In one subembodiment of the above embodiment, the physical shared channel comprises a PUSCH.

In one embodiment, the second information block indicates a TCI codepoint corresponding to any of the N2 information units.

In one embodiment, N2 is a positive integer no greater than 8 and greater than 1.

In one embodiment, the second information block is transmitted on a PDSCH.

In one embodiment, the steps marked by the box F52 in FIG. 5 do not exist.

In one embodiment, the steps marked by the box F53 in FIG. 5 exist, while the steps marked by the box F54 do not exist; the first reference-signal resource is reserved for the first reference signal.

In one embodiment, the steps marked by the box F53 in FIG. 5 do not exist, while the steps marked by the box F54 exist; and the first reference-signal resource is reserved for the first reference signal.

In one embodiment, the steps marked by the box F55 in FIG. 5 exist; the second signaling is used for triggering transmission of the first signal.

In one embodiment, the first signal comprises an SRS.

In one embodiment, the first signal comprises an aperiodic SRS.

In one embodiment, the second signaling is a dynamic signaling.

In one embodiment, the second signaling comprises one or more fields in a piece of DCI.

In one embodiment, the second signaling comprises DCI for UpLink Grant.

In one embodiment, the second signaling comprises DCI for DownLink Grant.

In one embodiment, the second signaling is used for determining time-domain resources occupied by the first signal.

In one embodiment, the second signaling is transmitted on a PDCCH.

In one embodiment, the steps marked by the box F55 in FIG. 5 do not exist.

In one embodiment, the steps marked by the box F56 in FIG. 5 exist; the second signal carries a first bit block group, and the first signal indicates whether the first bit block group is correctly received.

In one embodiment, the second signal is transmitted on a PDSCH.

In one embodiment, the second signaling comprises scheduling information of the second signal.

In one embodiment, the first signaling comprises scheduling information of the second signal.

In one embodiment, the scheduling information of the second signal comprises one or more of occupied time-domain resources, occupied frequency-domain resources, an MCS, configuration information of DMRS, an HARQ process number, an RV or an NDI.

In one embodiment, the first bit block group comprises a positive integer number of bit block(s), and any bit block in the first bit block group is one of a TB, a CB or a CBG.

In one embodiment, the first signal indicates whether each bit block in the first bit block group is correctly received.

In one embodiment, the first signal indicates that all bit blocks in the first bit block group are correctly received, or at least one bit block in the first bit block group is not correctly received.

In one embodiment, the steps marked by box F56 in FIG. 5 do not exist.

Embodiment 6

Embodiment 6 illustrates a schematic diagram of a first information unit according to one embodiment of the present disclosure, as shown in FIG. 6. In Embodiment 6, the first information unit comprises the first field, and the first field in the first information unit indicates the first reference-signal resource.

In one embodiment, the first information unit comprises information in all or part of fields in an IE.

In one embodiment, the first information unit is an IE.

In one embodiment, the first information unit comprises information in all or part of fields in a TCI-State IE.

In one embodiment, the first information unit is a TCI-State IE.

In one embodiment, the specific meaning of the TCI-State IE can be found in 3GPP TS38.331.

In one embodiment, the first information unit indicates a TCI state corresponding to the first signal.

In one embodiment, the first information unit comprises a first index, and the first index is used for identifying the first information unit.

In one subembodiment of the above embodiment, the first signaling indicates the first index.

In one subembodiment of the above embodiment, the first index is a TCI-StateId.

In one subembodiment of the above embodiment, the first index is a non-negative integer.

In one embodiment, the first signaling indicates a TCI codepoint corresponding to the first information unit.

In one embodiment, the first field in the first information unit comprises information in one or more fields in a TCI-State IE.

In one embodiment, the first field in the first information unit comprises all or part of information in a qcl-Type1 field in a TCI-State IE.

In one embodiment, the first field in the first information unit comprises all or part of information in a qcl-Type2 field in a TCI-State IE.

In one embodiment, the first field in the first information unit comprises all or part of information in a QCL-Info IE.

In one embodiment, the first field in the first information unit indicates that the first reference-signal resource corresponds to a first associated type, and the first associated type indicates that the first reference-signal resource is used for determining the spatial-domain filter of the first signal.

In one embodiment, the first field in the first information unit indicates that a QCL type corresponding to the first reference-signal resource is QCL-typeD.

In one embodiment, the first information unit indicates a second reference-signal resource; and the second reference-signal resource is used for determining a transmission parameter of the first signal.

In one subembodiment of the above embodiment, the second reference-signal resource is used for determining a transmission parameter of the first signal different from a spatial-domain filter.

In one subembodiment of the above embodiment, the transmission parameter of the first signal comprise one or more of precoding, Timing advance (TA), a Phase-Tracking Reference Signal port, a transmission antenna or a transmission antenna panel.

In one subembodiment of the above embodiment, the transmission parameter of the first signal comprises one or more of delay spread, Doppler spread, Doppler shift, average delay or Spatial Rx parameters.

In one subembodiment of the above embodiment, the second reference-signal resource comprises a CSI-RS resource.

In one subembodiment of the above embodiment, the second reference-signal resource comprises an SRS resource.

In one subembodiment of the above embodiment, the second reference-signal resource comprises an SSB resource.

Embodiment 7

Embodiment 7 illustrates a schematic diagram of a first power control parameter group used for determining transmission power of a first signal according to one embodiment of the present disclosure; as shown in FIG. 7. In Embodiment 7, the first power control parameter group is used for determining a first reference parameter, and the first reference power is used for determining transmission power of the first signal.

In one embodiment, the first reference power is measured by dBm.

In one embodiment, transmission power of the first signal is measured by dBm.

In one embodiment, transmission power of the first signal is a minimum value of the first reference power and a first power threshold.

In one embodiment, transmission power of the first signal is a sum of a minimum value of the first reference power and a first power threshold plus a sixth component, and the sixth component is related to a bandwidth measured by Resource Block (RB) to which the first signal is allocated.

In one embodiment, the first power threshold is an Uplink transmission power threshold.

In one embodiment, the first power threshold is a transmission power threshold on Sidelink.

In one embodiment, the first power threshold is measured by dBm.

In one embodiment, the first power threshold is $P_{CMAX,f,c}(i)$.

In one embodiment, the first power threshold is $P_{CMAX}$.

In one embodiment, the first reference power is linearly related to a first component, and a linear coefficient of the first reference power and the first component is 1.

In one subembodiment of the above embodiment, the first component is a power reference.

In one subembodiment of the above embodiment, the first component is $P_{0\_PUSCH,b,f,c}(j)$.

In one subembodiment of the above embodiment, the first component is $P_0$ for uplink power control.

In one subembodiment of the above embodiment, the first component is $P_0$ for PUSCH power control.

In one subembodiment of the above embodiment, the first component is $P_{0\_PUCCH,b,f,c}(q_u)$.

In one subembodiment of the above embodiment, the first component is $P_0$ for PUCCH power control.

In one subembodiment of the above embodiment, the first component is $P_{0\_SRS,b,f,c}(q_s)$.

In one subembodiment of the above embodiment, the first component is $P_0$ for SRS power control.

In one embodiment, a measurement performed on a target reference signal is used for determining a first pathloss, and the target reference signal is transmitted in a target reference-signal resource; the first reference power is linearly related to the first pathloss, and a linear coefficient of the first reference power and the first pathloss is a first coefficient.

In one subembodiment of the above embodiment, the target reference-signal resource comprises a CSI-RS resource.

In one subembodiment of the above embodiment, the target reference-signal resource comprises an SSB resource.

In one subembodiment of the above embodiment, the target reference-signal resource comprises an SRS resource.

In one subembodiment of the above embodiment, the first pathloss is equal to transmission power of the target reference signal minus Reference Signal Received Power (RSRP) of the target reference signal.

In one subembodiment of the above embodiment, the first coefficient is a non-negative integer less than or equal to 1.

In one subembodiment of the above embodiment, the first coefficient is. $\alpha_{b,f,c}(j)$ In one subembodiment of the above embodiment, the first coefficient is $\alpha$ for Uplink power control.

In one subembodiment of the above embodiment, the first coefficient is $\alpha$ for PUSCH power control.

In one subembodiment of the above embodiment, the first coefficient is $\alpha_{SRS,b,f,c}(q_s)$.

In one subembodiment of the above embodiment, the first coefficient is $\alpha$ for SRS power control.

In one embodiment, the first reference power is linearly related to a fourth component, a linear coefficient of the first reference power and the fourth component is 1, and the fourth component is a power control adjustment state.

In one subembodiment of the above embodiment, the fourth component is the first power control parameter group for Uplink comprising power control for the first signal.

In one subembodiment of the above embodiment, the fourth component is a power control adjustment state for a PUSCH.

In one subembodiment of the above embodiment, the fourth component is $f_{b,f,c}(i, 1)$.

In one subembodiment of the above embodiment, the fourth component is a power control adjustment state for a PUCCH.

In one subembodiment of the above embodiment, the fourth component is $g_{b,f,c}(i, 1)$.

In one subembodiment of the above embodiment, the fourth component is a power control adjustment state for an SRS.

In one subembodiment of the above embodiment, the fourth component is $h_{b,f,c}(i, 1)$.

In one embodiment, the first reference power is linearly related to a second component, and a linear coefficient of the first reference power and the second component is 1; the second component is related to a bandwidth measured by RB to which the first signal is allocated.

In one embodiment, the first reference power is linearly related to a third component, a linear coefficient of the first reference power and the third component is 1, and the third component is related to an MCS of the first signal.

In one subembodiment of the above embodiment, the third component is $\Delta_{TF,b,f,c}(i)$.

In one embodiment, the first reference power is linearly related to a fifth component, a linear coefficient of the first reference power and the fifth component is 1, and the fifth component is related to a PUCCH format corresponding to the first signal.

In one subembodiment of the above embodiment, the fifth component is $\Delta_{F\_PUCCH}(F)$.

In one embodiment, the first reference power is respectively linearly related to the first component, the first pathloss and the second component; linear coefficients of the first reference power and the first component as well as of the first reference power and the second component are respectively 1, and a linear coefficient of the first reference power and the first pathloss is the first coefficient.

In one embodiment, the first reference power is respectively linearly related to the first component, the first pathloss, the second component, the third component and the fourth component; linear coefficients among the first reference power and the first component, the second component, the third component as well as the fourth component are respectively 1, and a linear coefficient of the first reference power and the first pathloss is the first coefficient.

In one embodiment, the first reference power is respectively linearly related to the first component, the first pathloss, the second component, the third component, the fourth component and a fifth component; linear coefficients among the first reference power and the first component, the first pathloss, the second component, the third component, the fourth component as well as a fifth component are respectively 1.

In one embodiment, the first reference power is respectively linearly related to the first component, the first pathloss, the second component and the fourth component; linear coefficients among the first reference power and the first component, the second component as well as the fourth component are respectively 1, and a linear coefficient of the first reference power and the first pathloss is the first coefficient.

In one embodiment, the first signal is transmitted on a BWP indexed by b on a carrier indexed by f of a serving cell indexed by c in a transmission occasion indexed by i.

In one embodiment, an index of a power control adjustment state corresponding to the first signal is 1.

In one embodiment, the first signal is transmitted on a PUSCH, and a parameter group configuration index corresponding to the first signal is j.

In one embodiment, the first signal comprises an SRS, and an index of an SRS resource set to which an SRS comprised in the first signal belongs is $q_s$.

In one embodiment, the first signal is transmitted on a PUCCH, an index of $P_0$ corresponding to the first signal is $q_u$, and a format of a PUCCH carrying the first signal is F.

In one embodiment, the first power control parameter group comprises the first component.

In one embodiment, the first power control parameter group comprises an ID of the target reference-signal resource.

In one embodiment, the first power control parameter group comprises the first coefficient.

In one embodiment, the first power control parameter group comprises an index of a power control adjustment state corresponding to the first signal.

In one embodiment, the first power control parameter group comprises one or more of the first component, the first coefficient, an identifier of the target reference-signal resource or an index of a power control adjustment state corresponding to the first signal.

In one embodiment, the first power control parameter group comprises the first component, the first coefficient, an identifier of the target reference-signal resource or an index of a power control adjustment state corresponding to the first signal.

In one embodiment, the first power control parameter group comprises the first component, an identifier of the target reference-signal resource or an index of a power control adjustment state corresponding to the first signal.

In one embodiment, the first power control parameter group comprises an identifier of the target reference-signal resource or an index of a power control adjustment state corresponding to the first signal.

Embodiment 8

Embodiment 8 illustrates a schematic diagram of whether a relation between a first power control parameter group and a first information unit comprises a first power control parameter group related to a first information unit according to one embodiment of the present disclosure; as shown in FIG. 8. In Embodiment 8, the transmission type of the first signal is used for determining whether the first power control parameter group is related to the first information unit.

In one embodiment, when the transmission type of the first signal belongs to a first transmission type subset, the first power control parameter group is related to the first information unit; and when the transmission type of the first signal does not belong to the first transmission type subset, the first power control parameter group is unrelated to the first information unit.

In one embodiment, if the transmission type of the first signal belongs to a first transmission type subset, the first power control parameter group is related to the first information unit; and if the transmission type of the first signal does not belong to a first transmission type subset, the first power control parameter group is unrelated to the first information unit.

In one embodiment, when the first power control parameter group is unrelated to the first information unit and the first information unit is the first-type information unit, the first power control parameter group is unrelated to the second field in the first information unit.

In one embodiment, when the transmission type of the first signal belongs to a first transmission type subset, the first power control parameter group is related to the first information unit; when the transmission type of the first signal does not belong to the first transmission type subset, whether the first information unit is the first-type information unit or the second-type information unit is used for determining whether the first power control parameter group is related to the first information unit.

In one subembodiment of the above embodiment, when the transmission type of the first signal does not belong to the first transmission type subset and the first information unit is the first-type information unit, the first power control parameter group is related to the first information unit; and when the transmission type of the first signal does not belong to the first transmission type subset and the first information unit is the second-type information unit, the first power control parameter group is unrelated to the first information unit.

In one embodiment, the first transmission type subset comprises a positive integer number of transmission type(s).

In one embodiment, the first transmission type subset is a subset of the first transmission type set in Embodiment 1.

In one embodiment, the first transmission type subset only comprises one transmission type.

In one embodiment, the first transmission type subset comprises multiple transmission types.

In one embodiment, the first transmission type subset comprises PUSCH transmission.

In one embodiment, the first transmission type subset comprises PUCCH transmission.

In one embodiment, the first transmission type subset comprises SRS transmission.

In one embodiment, the first transmission type subset consists of PUSCH transmission.

In one embodiment, the first transmission type subset consists of PUSCH transmission and PUCCH transmission.

In one embodiment, the phrase that the first power control parameter group is related to the first information unit comprises: the first information unit is used for determining the first power control parameter group.

In one embodiment, the phrase that the first power control parameter group is related to the first information unit comprises: the first information unit is used for determining all of power control parameters of the first power control parameter group.

In one embodiment, the phrase that the first power control parameter group is related to the first information unit comprises: the first information unit is used for determining part of power control parameters of the first power control parameter group.

In one embodiment, the phrase that the first power control parameter group is related to the first information unit comprises: the first information unit indicates the first power control parameter group.

In one embodiment, the phrase that the first power control parameter group is related to the first information unit comprises: the first information unit indicates all of power control parameters in the first power control parameter group.

In one embodiment, the phrase that the first power control parameter group is related to the first information unit comprises: the first information unit indicates part of power control parameters in the first power control parameter group.

In one embodiment, when the first power control parameter group is unrelated to the first information unit, a fourth information block is used for determining the first power control parameter group.

In one subembodiment of the above embodiment, the fourth information block indicates the first power control parameter group.

In one subembodiment of the above embodiment, the fourth information block comprises information in all or part of fields in an IE.

In one subembodiment of the above embodiment, the fourth information block is carried by a higher-layer signaling.

In one subembodiment of the above embodiment, the fourth information block is carried by an RRC signaling.

In one subembodiment of the above embodiment, the fourth information block is carried by a MAC CE signaling.

In one subembodiment of the above embodiment, the fourth information block is carried together by an RRC signaling and a MAC CE signaling.

In one subembodiment of the above embodiment, the fourth information block is carried by the first signaling.

In one subembodiment of the above embodiment, the fourth information block comprises a first information sub-block and a second information sub-block; the first information sub-block indicates Q1 power control parameter groups, Q1 being a positive integer greater than 1; the second information sub-block indicates the first power control parameter group out of the Q1 power control parameter groups.

In one reference embodiment of the above subembodiment, the first information sub-block is carried by an RRC signaling.

In one reference embodiment of the above subembodiment, the first information sub-block is carried by the first signaling.

In one reference embodiment of the above subembodiment, the second information sub-block is carried by a MAC CE signaling.

In one reference embodiment of the above subembodiment, the second information sub-block is carried by the first signaling.

In one reference embodiment of the above subembodiment, the second information sub-block activates the first power control parameter group out of the Q1 power control parameter groups.

Embodiment 9

Embodiment 9 illustrates a schematic diagram of whether a relation between a first power control parameter group and a first information unit comprises a first power control parameter group related to a first information unit according to one embodiment of the present disclosure; as shown in FIG. 9. In Embodiment 9, the first information unit indicates a fourth power control parameter group; the transmission type of the first signal is used for determining whether the first power control parameter group is related to the fourth power control parameter group.

In one embodiment, the fourth power control parameter group comprises one or more of $P_0$ for Uplink power control, a for Uplink power control, an identifier of a reference-signal resource for measuring pathloss or an index of a power control adjustment state.

In one embodiment, when the transmission type of the first signal belongs to the first transmission type subset in Embodiment 8, the first power control parameter group is related to the fourth power control parameter group; and when the transmission type of the first signal does not belong to the first transmission type subset, the first power control parameter group is unrelated to the fourth power control parameter group.

In one embodiment, if the transmission type of the first signal belongs to the first transmission type subset in Embodiment 8, the first power control parameter group is related to the fourth power control parameter group; and if the transmission type of the first signal does not belong to the first transmission type subset, the first power control parameter group is unrelated to the fourth power control parameter group.

In one embodiment, when the first power control parameter group is related to the first information unit, the first power control parameter group is related to the fourth power control parameter group; and when the first power control parameter group is unrelated to the first information unit, the first power control parameter group is unrelated to the fourth power control parameter group.

In one embodiment, the phrase that the first power control parameter group is related to a given power control parameter group comprises: the first power control parameter group is the given power control parameter group.

In one embodiment, the phrase that the first power control parameter group is related to a given power control parameter group comprises: the given power control parameter group is used for determining all of power control parameters of the first power control parameter group.

In one embodiment, the phrase that the first power control parameter group is related to a given power control parameter group comprises: the given power control parameter group is used for determining part of power control parameters of the first power control parameter group.

In one embodiment, the phrase that the first power control parameter group is related to a given power control parameter group comprises: the given power control parameter group comprises all of power control parameters of the first power control parameter group.

In one embodiment, the phrase that the first power control parameter group is related to a given power control parameter group comprises: the given power control parameter group comprises part of power control parameters of the first power control parameter group.

Embodiment 10

Embodiment 10 illustrates a schematic diagram of whether a relation between a first power control parameter group and a first information unit comprises a first power control parameter group related to which group of P1 power control parameter groups according to one embodiment of the present disclosure; as shown in FIG. 10. In Embodiment 10, the first power control parameter group is related to the first information unit; the relation between the first power control parameter group and the first information unit comprises that the first power control parameter group is related to which group of the P1 power control parameter groups.

In one embodiment, the first information unit is used by the first node for determining the P1 power control parameter groups.

In one embodiment, the transmission type of the first signal is used for determining that the first power control parameter group is related to which group of the P1 power control parameter groups.

In one embodiment, any of the P1 power control parameter groups comprise one or more of $P_0$ used for Uplink power control, a used for Uplink power control, an identifier of a reference-signal resource for measuring pathloss or an index of a power control adjustment state.

In one embodiment, values of at least one power control parameter comprised in any two of the P1 power control parameter groups are not equal.

In one embodiment, there exist values of power control parameters comprised in two of the P1 power control parameter groups being completely equal.

In one embodiment, a number of power control parameters comprised in any two of the P1 power control parameter groups are equal.

In one embodiment, there exist a number of power control parameters comprised in two of the P1 power control parameter groups being not equal.

In one embodiment, P1 is equal to 2.

In one embodiment, P1 is equal to 3.

In one embodiment, the first information unit indicates the P1 power control parameter groups.

In one embodiment, the first information unit explicitly indicates the P1 power control parameter groups.

In one embodiment, the first information unit implicitly indicates the P1 power control parameter groups.

In one embodiment, the first information unit comprises P1 fields, and the P1 fields respectively indicate the P1 power control parameter groups.

In one embodiment, the first power control parameter group is related to only one group of the P1 power control parameter groups.

In one embodiment, the first power control parameter group is related to multiple groups of the P1 power control parameter groups.

In one embodiment, the P1 power control parameter groups respectively correspond to P1 transmission type subsets, and the transmission type of the first signal belongs to a target transmission type subset of the P1 transmission type subsets; the first power control parameter group is one of the P1 power control parameter group corresponding to the target transmission type subset; and any of the P1 transmission type subsets comprises a positive integer number of transmission type(s).

In one subembodiment of the above embodiment, any of the P1 transmission type subsets is a subset of the first transmission type set in Embodiment 1.

In one subembodiment of the above embodiment, there does not exist a transmission type that simultaneously belongs to two different transmission type subsets of the P1 transmission type subsets.

Embodiment 11

Embodiment 11 illustrates a schematic diagram of whether a relation between a first power control parameter group and a first information unit comprises a first power control parameter group related to which group of P1 power control parameter groups according to one embodiment of the present disclosure; as shown in FIG. 11. In Embodiment 11, when the first power control parameter group is related to the first information unit, the relation between the first power control parameter group and the first information unit also comprises that the first power control parameter group is related to which group of the P1 power control parameter groups.

In one embodiment, if the first power control parameter group is related to the first information unit, the relation between the first power control parameter group and the first information unit also comprises that the first power control parameter group is related to which group of the P1 power control parameter groups.

In one embodiment, when the first power control parameter group is related to the first information unit, the transmission type of the first signal is used for determining that the first power control parameter group is related to which group of the P1 power control parameter groups.

Embodiment 12

Embodiment 12 illustrates a schematic diagram of whether a first information unit is a first-type information unit or a second-type information unit related to a transmission type of a first signal according to one embodiment of the present disclosure, as shown in FIG. 12.

In one embodiment, the first-type information unit comprises information in all or part of fields in an IE.

In one embodiment, the first-type information unit is an IE.

In one embodiment, the first-type information unit comprises information in all or part of fields in a TCI-State IE.

In one embodiment, the first-type information unit is a TCI-State IE.

In one embodiment, the second-type information unit comprises information in all or part of fields in an IE.

In one embodiment, the second-type information unit is an IE.

In one embodiment, the second-type information unit comprises information in all or part of fields in a TCI-State IE.

In one embodiment, the second-type information unit is a TCI-State IE.

In one embodiment, the second field in the first-type information unit is used by the first node for determining a power control parameter group.

In one embodiment, the second field comprises information in one or more fields in an IE.

In one embodiment, the second field comprises all or part of information in a pucch-PowerControl field in a PUCCH-Config IE.

In one embodiment, the second field comprises all or part of information in a PUCCH-PowerControl IE.

In one embodiment, the second field comprises all or part of information in an alpha field in an SRS-ResourceSet IE.

In one embodiment, the second field comprises all or part of information in a p0 field in an SRS-ResourceSet IE.

In one embodiment, the second field comprises all or part of information in a pathlossReferenceRS field in an SRS-ResourceSet IE.

In one embodiment, the second field comprises all or part of information in an srs-PowerControlAdjustmentStates field in an SRS-ResourceSet IE.

In one embodiment, the second field in the first-type information unit indicates a power control parameter group.

In one embodiment, a power control parameter group which the second field in the first-type information unit is used for determining comprises one or more of $P_0$ for Uplink power control, a for Uplink power control, an identifier of a reference-signal resource for measuring pathloss or an index of a power control adjustment state.

In one embodiment, the transmission type of the first signal is used for determining whether the first information unit is the first-type information unit or the second-type information unit.

In one embodiment, when the transmission type of the first signal belongs to a third transmission type subset, the first information unit is the first-type information unit.

In one embodiment, when the transmission type of the first signal belongs to the third transmission type subset, the first information unit is the first-type information unit, the first information unit is the first-type information unit, the second field in the first information unit is used for determining a second power control parameter group, and the first power control parameter group is related to the second power control parameter group.

In one embodiment, the second power control parameter group comprises all or part of power control parameters in the first power control parameter group.

In one embodiment, when the transmission type of the first signal does not belong to the third transmission type subset, the first information unit is the second-type information unit.

In one embodiment, when the transmission type of the first signal does not belong to the third transmission type subset, the first information unit is the first-type information unit or the second-type information unit.

In one embodiment, the third transmission type subset comprises a positive integer number of transmission type(s).

In one embodiment, the third transmission type subset is a subset of the first transmission type set in Embodiment 1.

In one embodiment, the third transmission type subset is the first transmission type subset in Embodiment 8.

In one embodiment, the third transmission type subset consists of PUSCH transmission.

In one embodiment, the third transmission type subset consists of PUSCH transmission and PUCCH transmission.

In one embodiment, when the first information unit is the first-type information unit, the second field in the first information unit indicates the P1 power control parameter groups.

In one subembodiment of the above embodiment, the second field in the first information unit comprises P1 sub-fields, and the P1 sub-fields respectively indicate the P1 power control parameter groups.

In one embodiment, when the first power control parameter group is related to the first information unit, the first information unit is the first-type information unit.

In one embodiment, when the first power control parameter group is related to the first information unit and the first information unit is the first-type information unit, the first information unit is the first-type information unit, the second field in the first information unit is used for determining a second power control parameter group, and the first power control parameter group is related to the second power control parameter group.

In one embodiment, when the first information unit is the first-type information unit, the first power control parameter group is related to the first information unit.

In one embodiment, when the first information unit is the first-type information unit, and the transmission type of the first signal is used for determining whether the first power control parameter group is related to the first information unit.

In one embodiment, when the first information unit is the second-type information unit, the first power control parameter group is unrelated to the first information unit.

In one embodiment, if the transmission type of the first signal belongs to the second transmission type subset and the first information unit is the first-type information unit, the first power control parameter group is unrelated to the second field in the first information unit.

In one embodiment, when the transmission type of the first signal belongs to the second transmission type subset, the first information unit is the first-type information unit or the second-type information unit.

In one embodiment, the second transmission type subset comprises a positive integer number of transmission type(s).

In one embodiment, the second transmission type subset is a subset of the first transmission type set in Embodiment 1.

In one embodiment, the second transmission type subset comprises SRS transmission.

In one embodiment, the second transmission type subset consists of SRS transmission.

In one embodiment, the second transmission type subset comprises PUCCH transmission.

In one embodiment, the second transmission type subset consists of SRS transmission and PUCCH transmission.

In one embodiment, the second transmission type subset comprises PUSCH transmission.

In one embodiment, there does not exist a transmission type that belongs to the second transmission type subset and the first transmission type subset in Embodiment 8 simultaneously.

In one embodiment, the second transmission type subset consists of all transmission types in the first transmission type set that does not belong to the first transmission type subset in Embodiment 8.

In one embodiment, there does not exist a transmission type that belongs to the second transmission type subset and the third transmission type subset simultaneously.

In one embodiment, the second transmission type subset consists of all transmission types in the first transmission type set that does not belong to the third transmission type subset.

In one embodiment, when the first power control parameter group is unrelated to the second field in the first information unit, the first power control parameter group is unrelated to the first information unit.

In one embodiment, when the first power control parameter group is unrelated to the second field in the first information unit, the first node ignores the second field in the first information unit.

In one embodiment, when the first power control parameter group is unrelated to the second field in the first information unit, the fourth information block in Embodiment 8 is used for determining the first power control parameter group.

Embodiment 13

Embodiment 13 illustrates a schematic diagram of relations among P1 power control parameter groups and P1 transmission types according to one embodiment of the present disclosure; as shown in FIG. 13. In Embodiment 13, the target power control parameter group is one of the P1 power control parameter groups corresponding to the transmission type of the first signal, and the first power control parameter group is related to the target power control parameter group. In FIG. 13, indexes of the P1 power control parameter groups and the P1 transmission types are respectively #0, . . . , #(P1-1).

In one embodiment, the phrase that the first power control parameter group is related to the target power control parameter group comprises: the target power control parameter group is used for determining the first power control parameter group.

In one embodiment, the phrase that the first power control parameter group is related to the target power control parameter group comprises: the target power control parameter group is used for determining part of power control parameters of the first power control parameter group.

In one embodiment, the phrase that the first power control parameter group is related to the target power control parameter group comprises: the target power control parameter group is used for determining all of power control parameters of the first power control parameter group.

In one embodiment, the phrase that the first power control parameter group is related to the target power control parameter group comprises: the first power control parameter group is the target power control parameter group.

In one embodiment, the phrase that the first power control parameter group is related to the target power control parameter group comprises: the target power control parameter group comprises all of power control parameters of the first power control parameter group.

In one embodiment, the phrase that the first power control parameter group is related to the target power control parameter group comprises: the target power control parameter group comprises part of power control parameters of the first power control parameter group.

In one embodiment, the P1 transmission types are mutually different.

In one embodiment, the first transmission type set in Embodiment 1 consists of the P1 transmission type groups.

In one embodiment, the P1 transmission types is a subset of the first transmission type set in Embodiment 1.

In one embodiment, P1 is no less than 3, and the P1 transmission types comprises PUSCH transmission, PUCCH transmission and SRS transmission.

In one embodiment, P1 is equal to 3, and the P1 transmission types are respectively PUSCH transmission, PUCCH transmission and SRS transmission.

In one embodiment, the first power control parameter group comprises a first parameter sub-group and a second parameter sub-group, and the target power control parameter group is used for determining the first parameter sub-group; a third information block is used for determining the second parameter sub-group, and the second parameter sub-group is unrelated to the target power control parameter group.

In one subembodiment of the above embodiment, the first power control parameter group consists of the first parameter sub-group and the second parameter sub-group.

In one subembodiment of the above embodiment, there does not exist a power control parameter in the first power control parameter group that belongs to the first parameter sub-group and the second parameter sub-group simultaneously.

In one subembodiment of the above embodiment, the first parameter sub-group comprises an identifier of a reference-signal resource for measuring pathloss when calculating transmission power of the first signal and an index of a power control adjustment state corresponding to the first signal.

In one subembodiment of the above embodiment, the second parameter sub-group comprises $P_0$ for power control of the first signal.

In one subembodiment of the above embodiment, the second parameter sub-group comprises $\alpha$ for power control of the first signal.

In one subembodiment of the above embodiment, the target power control parameter group comprises all power control parameters in the first parameter sub-group.

In one subembodiment of the above embodiment, the first parameter sub-group is the target power control parameter group.

In one subembodiment of the above embodiment, the third information block comprises information in all or part of fields in an IE.

In one subembodiment of the above embodiment, the third information block is carried by a higher-layer signaling.

In one subembodiment of the above embodiment, the third information block is carried by an RRC signaling.

In one subembodiment of the above embodiment, the third information block is carried by a MAC CE signaling.

In one subembodiment of the above embodiment, the third information block is carried together by an RRC signaling and a MAC CE signaling.

In one subembodiment of the above embodiment, the third information block is carried by the first signaling.

In one subembodiment of the above embodiment, the third information block comprises a third information sub-block and a fourth information sub-block; the third information sub-block indicates Q2 power control parameter groups, Q2 being a positive integer greater than 1; the fourth information sub-block indicates a third power control parameter group out of the Q2 power control parameter groups, and the third power control parameter group comprises all of the power control parameters in the second parameter sub-group.

In one subembodiment of the above embodiment, the third information sub-block is carried by an RRC signaling.

In one reference embodiment of the above subembodiment, the third information sub-block is carried by the first signaling.

In one reference embodiment of the above subembodiment, the fourth information sub-block is carried by a MAC CE signaling.

In one reference embodiment of the above subembodiment, the fourth information sub-block activates the third power control parameter group out of the Q2 power control parameter groups.

Embodiment 14

Embodiment 14 illustrates a schematic diagram of a first signaling according to one embodiment of the present disclosure, as shown in FIG. 14. In Embodiment 14, the first signaling comprises a third field; and the third field in the first signaling indicates the first information unit.

In one embodiment, the third field comprises part or all of information in a TCI field.

In one embodiment, the third field indicates a TCI.

In one embodiment, the third field comprises 3 bits.

In one embodiment, the third field comprises all or part of information in an SRS resource indicator field.

In one embodiment, the third field comprises all or part of information in a spatialRelationInfo field in an SRS-Resource IE.

In one embodiment, the third field comprises all or part of information in an SRS-SpatialRelationInfo IE.

In one embodiment, the third field comprises all or part of information in a spatialRelationInfoToAddModList field in a PUCCH-Config IE.

In one embodiment, the third field comprises all or part of information in a PUCCH-SpatialRelationInfo IE.

In one embodiment, the first signaling comprises a fourth field, and the fourth field in the first signaling is used for determining the fourth information block in Embodiment 8.

In one subembodiment of the above embodiment, the fourth field in the first signaling indicates the fourth information block.

In one subembodiment of the above embodiment, the fourth field in the first signaling indicates the first information sub-block in Embodiment 8.

In one subembodiment of the above embodiment, the fourth field in the first signaling comprises all or part of information in a pucch-PowerControl field in a PUCCH-Config IE.

In one subembodiment of the above embodiment, the fourth field in the first signaling comprises information in all or part of fields in an alpha field, a p0 field, a pathlossReferenceRS field or an srs-PowerControlAdjustmentStates field in an SRS-ResourceSet IE.

In one embodiment, the first signaling comprises a fifth field, and the fifth field in the first signaling is used for determining the third information block in Embodiment 13.

In one subembodiment of the above embodiment, the fifth field in the first signaling indicates the third information block.

In one subembodiment of the above embodiment, the fifth field in the first signaling indicates the third information sub-block in Embodiment 13.

In one subembodiment of the above embodiment, the fifth field in the first signaling comprises all or part of information in a pucch-PowerControl field in a PUCCH-Config IE.

In one subembodiment of the above embodiment, the fifth field in the first signaling comprises information in all or part of fields in an alpha field, a p0 field, a pathlossReferenceRS field or an srs-PowerControlAdjustmentStates field in an SRS-ResourceSet IE.

Embodiment 15

Embodiment 15 illustrates a schematic diagram of a first information block according to one embodiment of the present disclosure, as shown in FIG. 15. In Embodiment 15, the first information block is used for determining the N1 information units.

In one embodiment, the first signaling indicates the first information unit out of the N1 information units.

In one embodiment, the N1 information units at least comprises the first-type information unit and the second-type information unit.

In one embodiment, the first information block is carried by a higher-layer signaling.

In one embodiment, the first information block is carried by an RRC signaling.

In one embodiment, the first information block is carried by a MAC CE signaling.

In one embodiment, the first information block is transmitted on a Downlink.

In one embodiment, the first information block is transmitted on a Sidelink.

In one embodiment, the first information block comprises a positive integer number of information bit(s).

In one embodiment, the first information block comprises all or part of fields in an IE.

In one embodiment, the first information block comprises information in all or part of fields in a PDSCH-Config IE.

In one embodiment, the first information block comprises all or part of information in a tci-StatesToAddModList field in a PDSCH-Config IE.

In one embodiment, the first information block indicates the N1 information units.

In one embodiment, any of the N1 information units comprises information in all or part of fields in an IE.

In one embodiment, any of the N1 information units is an IE.

In one embodiment, any of the N1 information units comprises information in all or part of fields in a TCI-State IE.

In one embodiment, any of the N1 information units is a TCI-State IE.

In one embodiment, N1 is a positive integer greater than 1 and no greater than 128.

In one embodiment, N1 is equal to one of 4, 8, 16, 32, 64 or 128.

Embodiment 16

Embodiment 16 illustrates a structure block diagram of a processing device in a first node according to one embodiment of the present disclosure; as shown in FIG. 16. In FIG. 16, the processing device 1600 in the first node comprises a first receiver 1601 and a first transmitter 1602.

In Embodiment 16, a first receiver 1601 receives a first signaling; and the first transmitter 1602 transmits a first signal.

In Embodiment 16, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

In one embodiment, the relation between the first power control parameter group and the first information unit comprises whether the first power control parameter group is related to the first information unit.

In one embodiment, the first information unit is used for determining P1 power control parameter groups, P1 being a positive integer greater than 1; the relation between the first power control parameter group and the first information unit comprises that the first power control parameter group is related to which group of the P1 power control parameter groups.

In one embodiment, the first information unit is a first-type information unit or a second-type information unit; the first-type information unit comprises the first field and a second field, and the second-type information unit comprises only the first field in the first field and the second field; the second field in the first-type information unit is used for determining a power control parameter group; whether the first information unit is the first-type information unit or the second-type information unit is related to the transmission type of the first signal.

In one embodiment, when the transmission type of the first signal belongs to the second transmission type subset and the first information unit is the first-type information unit, the first power control parameter group is unrelated to the second field in the first information unit.

In one embodiment, the P1 power control parameter groups respectively correspond to P1 transmission types, and the transmission type of the first signal is one of the P1 transmission types; a target power control parameter group is one of the P1 power control parameter groups corresponding to the transmission type of the first signal, and the first power control parameter group is related to the target power control parameter group.

In one embodiment, the first receiver 1601 receives a first information block; herein, the first information block is used for determining N1 information units, and the first information unit is one of the N1 information units, N1 being a positive integer greater than 1.

In one embodiment, the first node is a UE.

In one embodiment, the first node is a relay node.

In one embodiment, the first receiver 1601 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 1602 comprises at least one of the antenna 452, the transmitter 454, the transmitting processor 468, the multi-antenna transmitting processor 457, the controller/processor 459, the memory 460, or the data source 467 in Embodiment 4.

Embodiment 17

Figure 17:
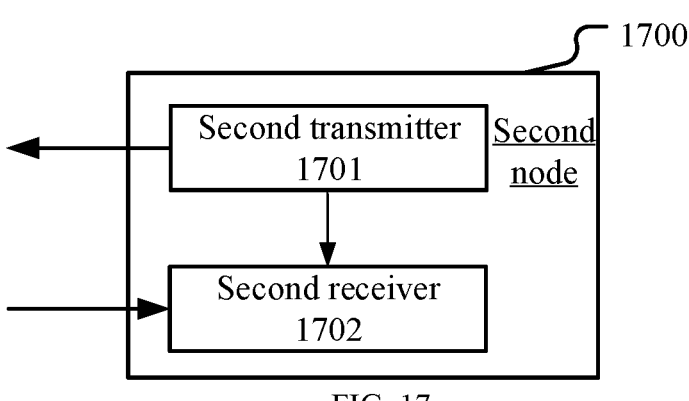
FIG. 17 illustrates a structure block diagram of a processing device in a second node according to one embodiment of the present disclosure.

Embodiment 17 illustrates a structure block diagram of a processing device in a second node according to one embodiment of the present disclosure; as shown in FIG. 17. In FIG. 17, the processing device 1700 in the second node comprises a second transmitter 1701 and a second receiver 1702.

In Embodiment 17, a second transmitter 1701 transmits a first signaling; and the second receiver 1702 receives a first signal.

In Embodiment 17, the first signaling is used for determining configuration information of the first signal; the first signaling is used for determining a first information unit, the first information unit comprises a first field, the first field in the first information unit indicates a first reference-signal resource, and the first reference-signal resource is used for determining a spatial-domain filter of the first signal; a first power control parameter group is used for determining transmission power of the first signal, and a relation between the first power control parameter group and the first information unit is related to a transmission type of the first signal.

In one embodiment, the relation between the first power control parameter group and the first information unit comprises whether the first power control parameter group is related to the first information unit.

In one embodiment, the first information unit is used for determining P1 power control parameter groups, P1 being a positive integer greater than 1; the relation between the first power control parameter group and the first information unit comprises that the first power control parameter group is related to which group of the P1 power control parameter groups.

In one embodiment, the first information unit is a first-type information unit or a second-type information unit; the first-type information unit comprises the first field and a second field, and the second-type information unit comprises only the first field in the first field and the second field; the second field in the first-type information unit is used for determining a power control parameter group; whether the first information unit is the first-type information unit or the second-type information unit is related to the transmission type of the first signal.

In one embodiment, when the transmission type of the first signal belongs to the second transmission type subset and the first information unit is the first-type information unit, the first power control parameter group is unrelated to the second field in the first information unit.

In one embodiment, the P1 power control parameter groups respectively correspond to P1 transmission types, and the transmission type of the first signal is one of the P1 transmission types; a target power control parameter group is one of the P1 power control parameter groups corresponding to the transmission type of the first signal, and the first power control parameter group is related to the target power control parameter group.

In one embodiment, the second transmitter 1701 transmits a first information block; herein, the first information block is used for determining N1 information units, and the first information unit is one of the N1 information units, N1 being a positive integer greater than 1.

In one embodiment, the second node is a base station.

In one embodiment, the second node is a UE.

In one embodiment, the second node is a relay node.

In one embodiment, the second transmitter 1701 comprises at least one of the antenna 420, the transmitter 418, the transmitting processor 416, the multi-antenna transmitting processor 471, the controller/processor 475, or the memory 476 in Embodiment 4.

In one embodiment, the second receiver 1702 comprises at least one of the antenna 420, the receiver 418, the receiving processor 470, the multi-antenna receiving processor 472, the controller/processor 475, the memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE) for wireless communications, comprising:

a first receiver, receiving a first signaling; and a first transmitter, transmitting a first signal of a transmission type comprising one of a physical uplink shared channel (PUSCH) transmission, a physical uplink control channel transmission or a sounding reference signal (SRS) transmission; wherein:

the first signaling is used for determining configuration information of the first signal;

the first signaling indicates a first information unit, the first information unit comprising a first field;

the first field in the first information unit indicates a first reference-signal resource, the first reference-signal resource comprising a CSI-RS resource, a SS/PBCH block resource, or an SRS resource;

the first reference-signal resource is used for determining a spatial-domain filter of the first signal;

the first information unit comprises a first index, and the first index is used for identifying the first information unit;

a first power control parameter group is used for determining transmission power of the first signal;

the first power control parameter group comprises one or more of $P_0$ for power control of the first signal, a for power control of the first signal, an identifier of a reference-signal resource for measuring pathloss for calculating transmission power of the first signal, or an index of a power control adjustment state corresponding to the first signal;

a relation between the first power control parameter group and the first information unit is related to the transmission type of the first signal;

the first information unit indicates three power control parameter groups, one power control parameter group for each of the transmission type of the first signal;

the relation between the first power control parameter group and the first information unit comprises that the first power control parameter group is related to which group of the three power control parameter groups;

the three power control parameter groups respectively correspond to the transmission type of the first signal;

a target power control parameter group is one of the three power control parameter groups corresponding to the transmission type of the first signal, and the first power control parameter group is related to the target power control parameter group.

2. The UE according to claim 1, wherein the target power control parameter group comprises all or part of power control parameters of the first power control parameter group.

3. The UE according to claim 1, wherein the first power control parameter group comprises a first parameter sub-group and a second parameter sub-group, and the first parameter sub-group is the target power control parameter group; a third information block is used for determining the second parameter sub-group.

4. The UE according to claim 1, wherein the first field in the first information unit indicates that the first reference-signal resource corresponds to a first associated type, and the first associated type indicates that the first reference-signal resource is used for determining the spatial-domain filter of the first signal.

5. The UE according to claim 1, wherein the first receiver receives a first information block used for determining N1 information units, and the first information unit is one of the N1 information units, N1 being a positive integer greater than 1; or, wherein the first receiver receives the first information block and a second information block; wherein the first information block is used for determining N1 information units, and wherein the first information unit is one of the N1 information units, N1 being a positive integer greater than 1; the second information block is used for activating N2 information units out of the N1 information units, N2 being a positive integer greater than 1 and no greater than the N1.

6. The UE according to claim 1, wherein the first signaling indicates a TCI codepoint corresponding to the first information unit.

7. A network node for wireless communications, comprising:

a second transmitter, transmitting a first signaling; and a second receiver, receiving a first signal of a transmission type comprising one of a physical uplink shared channel (PUSCH) transmission, a physical uplink control channel transmission or a sounding reference signal (SRS) transmission a; wherein:

the first signaling is used for determining configuration information of the first signal;

the first signaling indicates a first information unit comprising a first field;

the first field in the first information unit indicates a first reference-signal resource comprising a CSI-RS resource, a SS/PBCH block resource, or an SRS resource;

the first reference-signal resource is used for determining a spatial-domain filter of the first signal;

the first information unit comprises a first index, and the first index is used for identifying the first information unit;

a first power control parameter group is used for determining transmission power of the first signal;

the first power control parameter group comprises one or more of $P_0$ for power control of the first signal, a for power control of the first signal, and an identifier of a reference-signal resource for measuring pathloss for calculating transmission power of the first signal, or an index of a power control adjustment state corresponding to the first signal;

a relation between the first power control parameter group and the first information unit is related to the transmission type of the first signal;

the first information unit indicates three power control parameter groups, one power control parameter group for a corresponding one of the transmission type of the first signal;

the relation between the first power control parameter group and the first information unit comprises that the first power control parameter group is related to which group of the three power control parameter groups;

the three power control parameter groups respectively correspond to the transmission type of the first signal;

a target power control parameter group is one of the three power control parameter groups corresponding to the transmission type of the first signal; and the first power control parameter group is related to the target power control parameter group.

8. The network node according to claim 7, wherein the target power control parameter group comprises all or part of power control parameters of the first power control parameter group.

9. The network node according to claim 7, wherein the first power control parameter group comprises a first parameter sub-group and a second parameter sub-group, and the first parameter sub-group is the target power control parameter group; a third information block is used for determining the second parameter sub-group.

10. The network node according to claim 7, wherein the second transmitter transmits a first information block used for determining N1 information units, and the first information unit is one of the N1 information units, N1 being a positive integer greater than 1; or, wherein the second transmitter transmits the first information block and a second information block; wherein the first information block is used for determining N1 information units, and the first information unit is one of the N1 information units, N1 being a positive integer greater than 1; the second information block is used for activating N2 information units out of the N1 information units, N2 being a positive integer greater than 1 and no greater than the N1.

11. The network node according to claim 7, wherein the first signaling indicates a TCI codepoint corresponding to the first information unit.

12. A method for wireless communications performed by a user equipment (UE), the method comprising:

receiving a first signaling; and transmitting a first signal of a transmission type comprising one of a physical uplink shared channel (PUSCH) transmission, a physical uplink control channel transmission or a sounding reference signal (SRS) transmission a; wherein:

the first signaling is used for determining configuration information of the first signal;

the first signaling indicates a first information unit comprising a first field;

the first field in the first information unit indicates a first reference-signal resource, the first reference-signal resource comprising a CSI-RS resource, a SS/PBCH block resource, or an SRS resource;

the first reference-signal resource is used for determining a spatial-domain filter of the first signal;

the first information unit comprises a first index, and the first index is used for identifying the first information unit;

a first power control parameter group is used for determining transmission power of the first signal;

the first power control parameter group comprises one or more of $P_0$ for power control of the first signal, a for power control of the first signal, an identifier of a reference-signal resource for measuring pathloss for calculating transmission power of the first signal, or an index of a power control adjustment state corresponding to the first signal;

a relation between the first power control parameter group and the first information unit is related to the transmission type of the first signal;

the first information unit indicates three power control parameter groups, one power control parameter group for each of the transmission type of the first signal;

the relation between the first power control parameter group and the first information unit comprises that the first power control parameter group is related to which group of the three power control parameter groups;

the three power control parameter groups respectively correspond to transmission types of the first signal;

a target power control parameter group is one of the three power control parameter groups corresponding to the transmission type of the first signal; and the first power control parameter group is related to the target power control parameter group.

13. The method according to claim 12, wherein the target power control parameter group comprises all or part of power control parameters of the first power control parameter group.

14. The method according to claim 12, wherein the first power control parameter group comprises a first parameter sub-group and a second parameter sub-group, and the first parameter sub-group is the target power control parameter group; a third information block is used for determining the second parameter sub-group.

15. The method according to claim 12, wherein the first field in the first information unit indicates that the first reference-signal resource corresponds to a first associated type, and the first associated type indicates that the first reference-signal resource is used for determining the spatial-domain filter of the first signal.

16. The method according to claim 12, comprising:

receiving a first information block; wherein the first information block is used for determining N1 information units, and the first information unit is one of the N1 information units, N1 being a positive integer greater than 1;

or, receiving a first information block and a second information block; wherein the first information block is used for determining N1 information units, and the first information unit is one of the N1 information units, N1 being a positive integer greater than 1; the second information block is used for activating N2 information units out of the N1 information units, N2 being a positive integer greater than 1 and no greater than the N1.

17. The method according to claim 12, wherein the first signaling indicates a TCI codepoint corresponding to the first information unit.

18. A method for wireless communications by a base station, the method comprising:

transmitting a first signaling; and receiving a first signal of a transmission type comprising one of a physical uplink shared channel (PUSCH) transmission, a physical uplink control channel (PUCCH) transmission or a sounding reference signal (SRS) transmission;

wherein:

the first signaling is used for determining configuration information of the first signal;

the first signaling indicates a first information unit comprising a first field;

the first field in the first information unit indicates a first reference-signal resource, the first reference-signal resource comprising a CSI-RS resource, a SS/PBCH block resource, or an SRS resource;

the first reference-signal resource is used for determining a spatial-domain filter of the first signal;

the first information unit comprises a first index, and the first index is used for identifying the first information unit;

a first power control parameter group is used for determining transmission power of the first signal;

the first power control parameter group comprises one or more of $P_0$ for power control of the first signal, a for power control of the first signal, and an identifier of a reference-signal resource for measuring pathloss for calculating transmission power of the first signal, or an index of a power control adjustment state corresponding to the first signal;

a relation between the first power control parameter group and the first information unit is related to the transmission type of the first signal;

the first information unit indicates three power control parameter groups;

the relation between the first power control parameter group and the first information unit comprises that the first power control parameter group is related to which group of the three power control parameter groups;

the three power control parameter groups respectively correspond to the transmission types of the first signal;

a target power control parameter group is one of the three power control parameter groups corresponding to the transmission type of the first signal; and the first power control parameter group is related to the target power control parameter group.

19. The method according to claim 18, wherein the first power control parameter group comprises a first parameter sub-group and a second parameter sub-group, and the first parameter sub-group is the target power control parameter group; a third information block is used for determining the second parameter sub-group.

20. The method according to claim 18, wherein the first signaling indicates a TCI codepoint corresponding to the first information unit.

* * * * *